Figure 1:
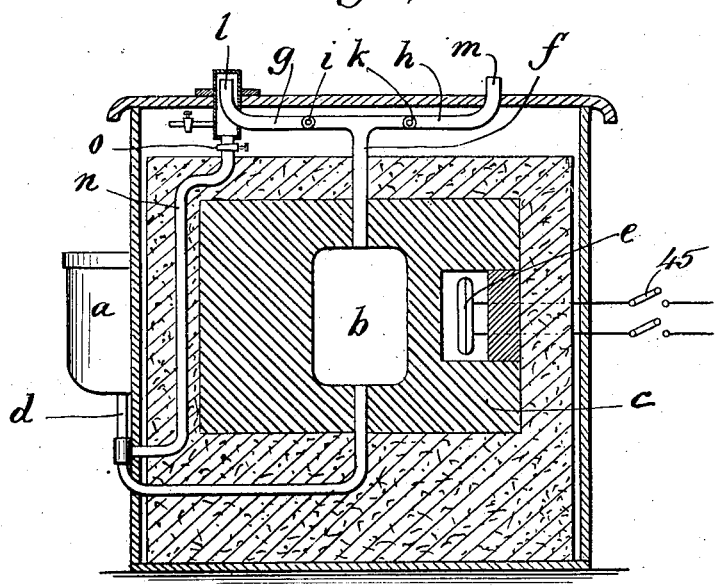

G. G. BELL.
APPARATUS FOR COOKING AND FOR CARRYING OUT LIKE OPERATIONS BY MEANS OF ELECTRICITY.
APPLICATION FILED NOV. 7, 1911.

1,069,377.

Patented Aug. 5, 1913.
6 SHEETS—SHEET 1.

WITNESSES:

INVENTOR
George Gilbert Bell
BY
Kenyon & Kenyon
ATTORNEYS

G. G. BELL.
APPARATUS FOR COOKING AND FOR CARRYING OUT LIKE OPERATIONS BY MEANS OF ELECTRICITY.
APPLICATION FILED NOV. 7, 1911.
1,069,377.
Patented Aug. 5, 1913.
6 SHEETS—SHEET 2.
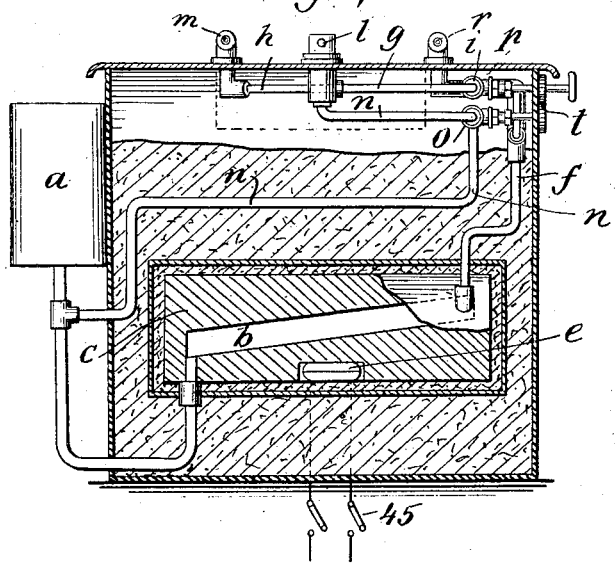
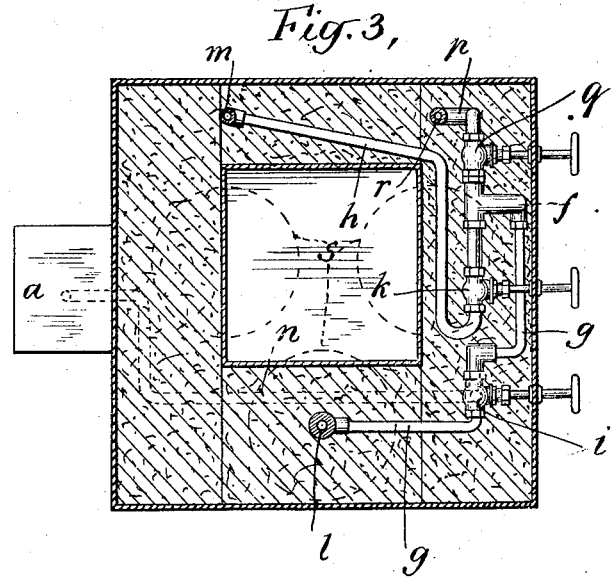
WITNESSES:
INVENTOR
George Gilbert Bell
BY
Kenyon & Kenyon
ATTORNEYS G. G. BELL.
APPARATUS FOR COOKING AND FOR CARRYING OUT LIKE OPERATIONS BY MEANS OF ELECTRICITY.
APPLICATION FILED NOV. 7, 1911.
1,069,377.
Patented Aug. 5, 1913.
6 SHEETS—SHEET 3.
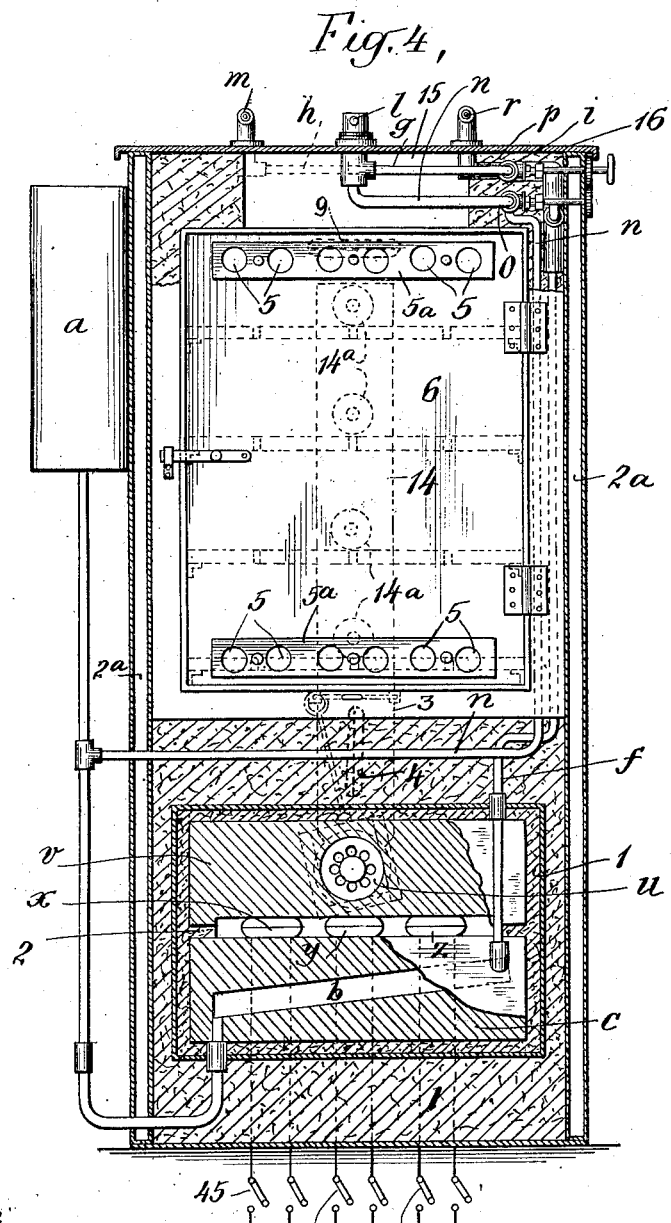

G. G. BELL.
APPARATUS FOR COOKING AND FOR CARRYING OUT LIKE OPERATIONS BY MEANS OF ELECTRICITY.
APPLICATION FILED NOV. 7, 1911.
1,069,377.
Patented Aug. 5, 1913.
6 SHEETS—SHEET 4.
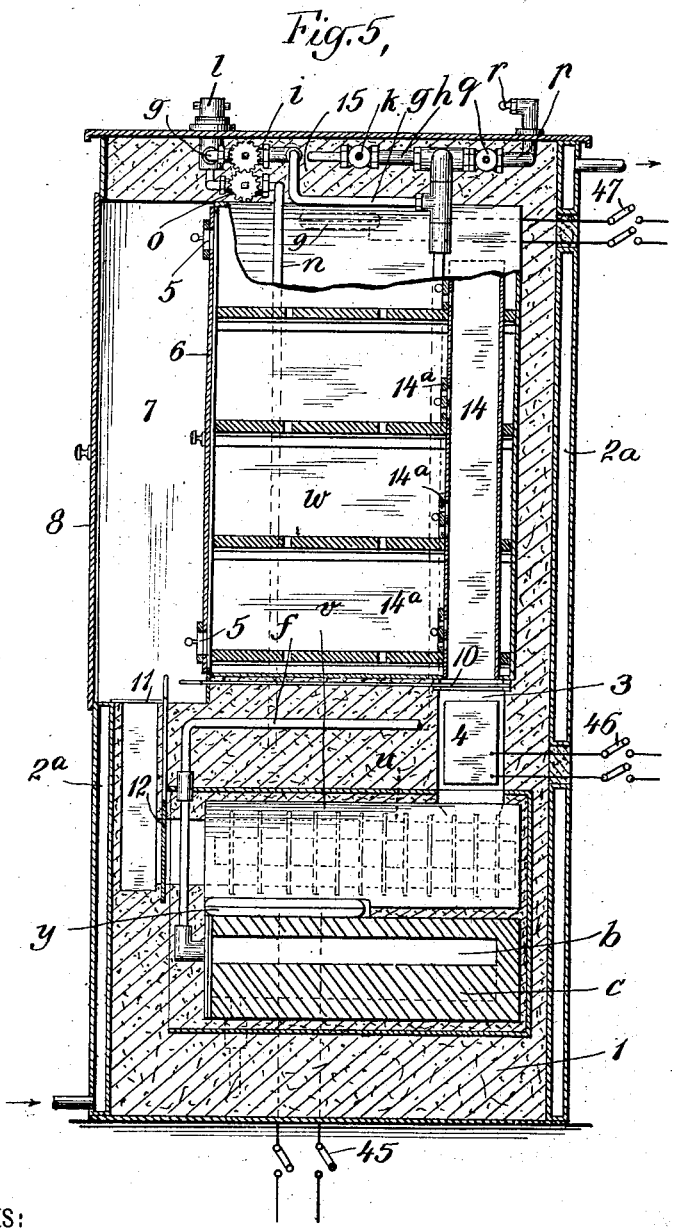
WITNESSES:
INVENTOR
George Gilbert Bell
BY
Kenyon & Kenyon
ATTORNEYS G. G. BELL.
APPARATUS FOR COOKING AND FOR CARRYING OUT LIKE OPERATIONS BY MEANS OF ELECTRICITY.
APPLICATION FILED NOV. 7, 1911.
1,069,377.
Patented Aug. 5, 1913.
6 SHEETS—SHEET 5.
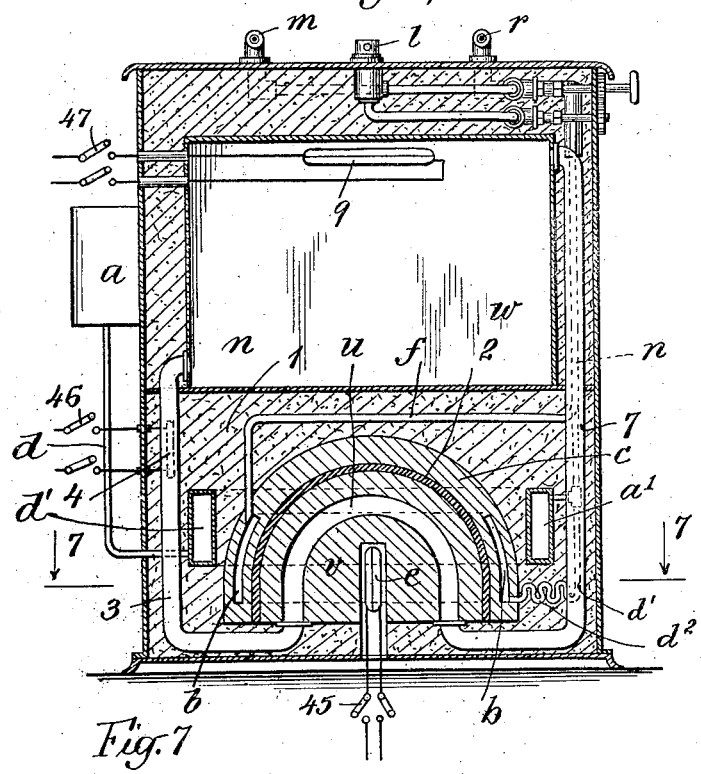
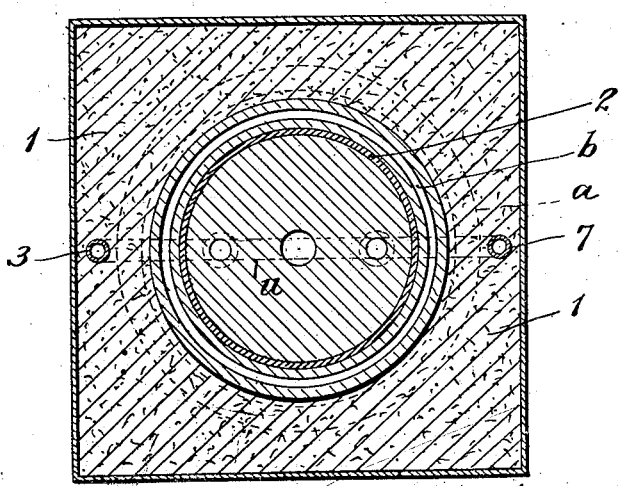

G. G. BELL.
APPARATUS FOR COOKING AND FOR CARRYING OUT LIKE OPERATIONS BY MEANS OF ELECTRICITY.
APPLICATION FILED NOV. 7, 1911.

1,069,377.

Patented Aug. 5, 1913.

6 SHEETS—SHEET 6.

WITNESSES:

INVENTOR
George Gilbert Bell
BY
Kenyon & Kenyon
ATTORNEYS

UNITED STATES PATENT OFFICE.

GEORGE GILBERT BELL, OF KENSINGTON, LONDON, ENGLAND, ASSIGNOR TO ELECTRIC HEAT STORAGE COMPANY, A CORPORATION OF NEW YORK.

APPARATUS FOR COOKING AND FOR CARRYING OUT LIKE OPERATIONS BY MEANS OF ELECTRICITY.

1,069,377.     Specification of Letters Patent.     Patented Aug. 5, 1913.

Application filed November 7, 1911. Serial No. 659,040.

*To all whom it may concern:*

Be it known that I, GEORGE GILBERT BELL, a subject of the King of Great Britain, and a resident of Kensington, London, England, have invented certain new and useful Improvements in Apparatus for Cooking and for Carrying Out Like Operations by Means of Electricity, of which the following is a specification.

This invention relates to improvements in apparatus for cooking and for carrying out like operations by means of electricity.

It has already been proposed to employ a thermal mass or heat accumulator of a material preferably having a high specific heat value and a high thermal conductivity, such as iron, which has been heated electrically, for the purpose of heating water, the mass being suitably protected or lagged by a covering of a material which is a poor conductor of heat so that it is capable of storing a considerable amount of heat. Now according to the present invention a steam space or chamber is formed in such a heat accumulator and is connected at or near its lower end say, by a pipe, to a feed water tank while at or near its upper end a steam supply pipe or pipes is or are taken out so that the steam may be used in cooking apparatus at any point as required and a pipe for the return of the condensed steam to the steam space in the heat accumulator may be employed if desired. The feed water tank is suitably arranged below the level of the place where the steam is applied to the cooking apparatus in order to prevent any sudden rush of water from the steam outlets in the event of a large amount of steam being suddenly used, and the return pipe aforesaid preferably returns to the steam space by way of the feed water pipe which is in connection with the steam space. Also according to this invention a steam producing apparatus of this type may be arranged in combination with an apparatus for heating a cooking oven by passing electrically heated air into it and in such an arrangement the heat accumulator containing the steam space may be heated by conduction from the heat accumulator for heating the air.

Figure 14:
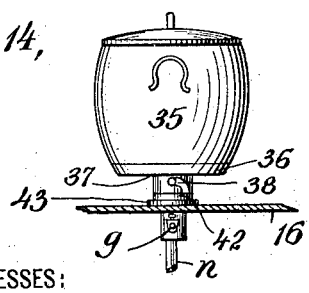
Figure 15:
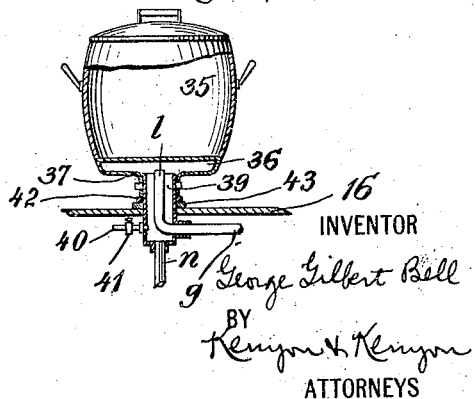

Referring to the accompanying drawings:—Figure 1 is a diagrammatic sectional front elevation of one arrangement of an improved electrical steam producing apparatus according to this invention. Fig. 2 is a sectional elevation of a modified form of apparatus, and Fig. 3 is a plan of Fig. 2 with the hot plate or cooking table removed to show the arrangement of the steam pipes and valves. Fig. 4 is a sectional front elevation of another modified form of cooking apparatus comprising an electrical steam producing apparatus combined with a cooking oven heated electrically by hot air, and Fig. 5 is a sectional side elevation of Fig. 4. Fig. 6 is a sectional elevation of a further modified form of apparatus, and Fig. 7 is a sectional plan on the line VII—VII of Fig. 6. Figs. 8 to 13 are elevations of arrangements for supplying steam to cooking pots. Fig. 14 is a side elevation and Fig. 15 is a sectional front elevation of an arrangement for supplying steam to a cooking pot in which a return pipe is provided for the condensed steam.

According to one arrangement and as illustrated in Fig. 1, the feed water tank $a$ communicates with the box-shaped steam space $b$ in the heat accumulator $c$ which is of rectangular section by means of a pipe or conduit $d$ and the heat accumulator $c$ is heated by a suitable electrical heating unit $e$. Steam is thus produced in the steam space $b$ under the pressure due to the head of water in the feed tank $a$ and this steam passes from the steam space $b$ by a pipe $f$ to steam supply pipes $g$, $h$, provided with valves $i$, $k$, or like means of control so that steam may be distributed as required to cooking vessels or pots which may be arranged at the steam outlets $l$ and $m$. It will be noticed that the feed tank $a$ is arranged so as to be below the level of the steam outlets $l$ and $m$ whereby any sudden rush of water from such outlets is prevented in the event of there suddenly being a large amount of steam used. A return pipe $n$ may be provided for the return of condensed steam from the cooking vessel at $l$ to the steam space $b$, by connecting the pipe $n$ to the feed water pipe $d$ as shown and this pipe $n$ may be fitted with a valve or like device $o$.

According to the modified arrangement shown in Figs. 2 and 3 the feed water tank $a$ is also arranged so that the level of the feed water tank is below the level of the outlet or outlets at which the steam is to be drawn off. The steam space $b$ is suitably shallow, more or less rectangular in section, and slightly inclined to the horizontal, while the heat accumulator $c$ is of rectangular section being heated by a heating unit $e$. Steam is produced in the steam space $b$, the pressure then existing therein being that due to the head of water owing to the position of the feed water tank $a$, and the steam passes by way of the pipe $f$ to steam supply pipes $g$, $h$, $p$. These steam supply pipes may be provided with valves $i$, $k$, $q$, or like means of control and they are also provided with respective steam outlets $l$, $m$, $r$. In operation, when steam is required for cooking purposes, water is admitted, as it becomes necessary from the feed tank $a$ to the heated steam space $b$ and the steam produced is, under control of the valves $i$, $k$, $q$, distributed as required to cooking utensils $s$, arranged at the steam outlets $l$, $m$, $r$. The cooking vessel at the steam outlet $l$ may, in addition to the steam supply pipe $g$, be provided with a pipe $n$ for the return of condensed steam to the steam space $b$ by way of the feed water pipe $d$ and the stems of the valves $i$ and $o$ in the two pipes $g$ and $n$ may be geared together by gearing $t$, or otherwise interconnected so that they may be regulated in relation to each other.

According to the modification illustrated in Figs. 4 and 5, an improved steam producing apparatus according to this invention is arranged compactly in a single structure with an apparatus for electrically heating air for supplying to an oven or the like. The air heating apparatus preferably, and as shown in this modification is of the kind described in my co-pending application for Letters Patent Serial No. 659039, the air being heated in a duct $u$ in a heat accumulator $v$ from which the heated air is passed into an oven $w$ to heat, the latter being then returned to the heat accumulator $v$ to be reheated. The heat accumulator $v$ for the hot air is superimposed upon the heat accumulator $c$ for the steam and a suitable number of heating elements $x$, $y$, $z$, are arranged between the two. Both heat accumulators $c$ and $v$ are as far as possible surrounded by heat insulating material or lagging 1 and the narrow space between the two heat accumulators, not occupied by the heating elements $x$, $y$, $z$, is also packed with lagging 2. A water jacket $2^a$ is provided around the insulating material 1 and the hot air flow pipe or duct 3 is provided with an extra heater 4 to increase the circulation of the air in the manner set forth in my co-pending application for Letters Patent aforesaid. The return of the cooled air from the oven $w$ is by way of a number of holes 5 in the top and if desired, and as shown, in the bottom of an inner door 6 of the oven and through the duct 7 between the inner oven door 6 and an outer oven door 8. The holes 5 may be controlled by dampers or hit and miss valves $5^a$ as shown, in order to regulate the flow of air through said holes. The oven $w$ is fitted with an additional heater 9 at the top to provide "top heat" during the preliminary portion of any cooking operation or as an auxiliary heater and suitable dampers 10, 11, and 12 are arranged in the air passages for regulating the circulation of air. Moreover, and in the same manner as described in my copending application for Letters Patent aforesaid, a flue or uptake 14 may be provided leading from or forming a continuation of the duct 3, the uptake being provided with hit and miss valves or dampers $14^a$ for controlling the admittance of air into the oven as desired. Such an uptake of course may be employed in connection with any of the constructions of heating apparatus herein described which are provided with an oven. The space 15 on top of the oven $w$ is packed with loose heat insulating material and is covered over by the hot plate or cooking table 16 for carrying the cooking utensils. As in the previous constructions a feed water tank $a$ is provided for supplying water to the steam space $b$ in the heat accumulator $c$ and steam from the space $b$ may pass by way of the pipes $f$, $g$, $h$, $p$, to the cooking utensils arranged at the steam outlets $l$, $m$ and $r$. The feed water tank as before, is below the level of the steam outlets $l$, $m$, $r$, and a return pipe $n$ is provided from the steam outlet $l$ to the steam space $b$. The steam pipes $g$, $h$, $p$ as before are provided with respective valves $i$, $k$, $q$, and the pipe $n$ is provided with a valve $o$ geared by gearing $t$ with the valve $i$.

In the modification shown in Figs. 6 and 7, the heat accumulator $c$ having the steam space $b$ therein is arranged somewhat in the manner of a saddle boiler around the heat accumulator $v$ for heating the air, the heat accumulator $v$ being heated by a heating unit $e$. The heat accumulators $c$, $v$, are surrounded by heat insulating material 1 and a thin layer of heat insulating material 2 is placed between the two heat accumulators being of such thickness that the heat accumulator $c$ may receive a certain amount of heat by conduction from the heat accumulator $v$ and keep at a temperature above the boiling point of water. The feed water tank $a$ in this arrangement feeds into a second feed water tank $a^1$ arranged in the insulating material 1 by a pipe $d$ and the water in the tank $a^1$ which becomes slightly heated or warmed owing to the insulating material 1 becoming heated passes to the steam space $b$ by the pipe $d^1$ and coil $d^2$ which latter prevents any rush of water from the tank $a^1$ to the steam space $b$. A coil such as $d^2$ may of course be provided in connection with any of the previous constructions. Above the heat accumulators is arranged an oven $w$ supplied with heated air from the duct $u$ in the heat accumulator $v$, by the pipe or duct 3, the air returning by the pipe or duct 7. A heating unit 4 may be arranged in the duct 3 for keeping up the circulation of the air and a preliminary heater 9 may also be arranged in the top of the oven $w$. The steam from the steam space $b$ may pass by way of the steam supply pipe $f$, to cooking utensils placed at the steam outlets $l$, $m$, $r$, which as before are above the level of the feed water tank $a$, and return pipe $n$ may be provided from the steam outlet $l$ back to the steam space $b$ by way of the pipe $d^1$ the arrangement being the same as in Figs. 2 to 5.

Figure 8:
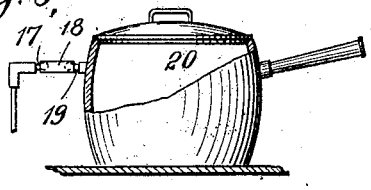
Figure 11:
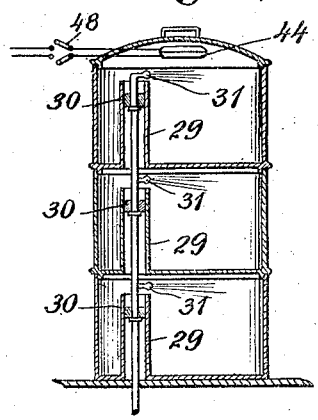
Figure 9:
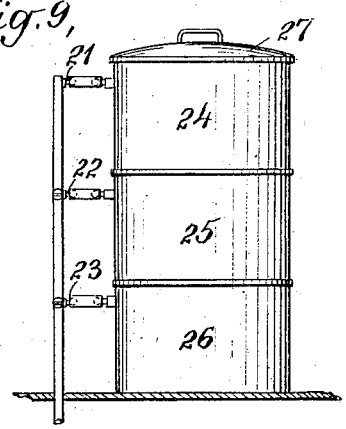
Figure 10:
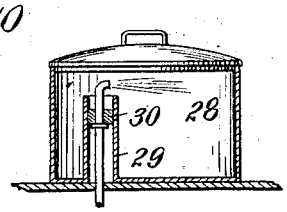

The construction and arrangement of the steam outlet $l$ in connection with cooking utensils and the adaptation of the steam nozzles $m$ and $r$ to cooking utensils will now be more particularly described with reference to Figs. 8 to 15. According to the arrangement as shown in Fig. 8 the steam supply pipe such as $h$ or $p$ in Figs. 2 to 7 is fitted with a nozzle 17 adapted to be connected by a tubular sleeve 18 to a nozzle 19 fitted to the cooking pot 20 in its upper portion. The sleeve or connector 18 may be made of metal or a short length of india rubber pipe may be employed. In another modification shown in Fig. 9 the steam pipe is provided with several lateral nozzles 21, 22, 23, at various heights, each being adapted to be connected to a corresponding nozzle on a cooking vessel. The cooking vessels 24, 25, 26, are arranged in a vertical column, the uppermost one being provided with a lid or cover 27. According to a further modification illustrated in Fig. 10 and in which the cooking pot 28 may be very easily placed in connection with the steam pipe, the latter, as shown, is allowed to project into a large tube 29 fitted to the bottom of the cooking pot 28 and projecting internally into the latter. The joint between the steam pipe and tube 29 is made by a large india rubber washer 30 through which the steam pipe is passed as shown. In using this type of joint for the steam pipe, also, a number of cooking vessels may be arranged in a vertical column as shown in Fig. 11 the top vessel, only, requiring an ordinary lid. In Fig. 11, in which similar parts to those shown in Fig. 10 are similarly lettered the steam pipe is provided with lateral nozzles 31 one for each cooking pot. The modifications shown in Figs. 12 and 13 provide means for cooking with steam in such cases in which it is necessary to prevent contact of the moisture with the food being cooked.

Figure 12:
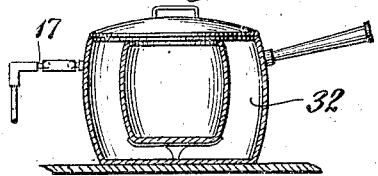
Figure 13:
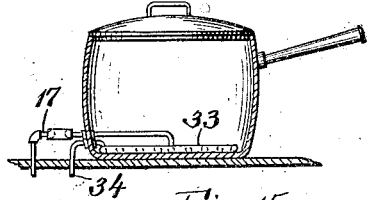

In Fig. 12 a steam nozzle 1, in a similar manner to that shown in Fig. 8 delivers into a steam jacket 32 inclosing the cooking pot, and in Fig. 13, the steam nozzle 17, delivers steam into a steam coil 33 at the bottom of the cooking pot, a return pipe 34 being suitably provided for return of the steam. In another modification shown in Figs. 14 and 15 a system providing a steam outlet $l$ a supply pipe $g$ and a return pipe $n$ for the condensed steam such as in Figs. 1 to 7 is used. The cooking pot 35 is suitably provided with a steam space, such as a hollow bottom 36 or jacket which is supplied with steam by the pipe $g$. A neck 37 on the bottom surface of the steam space 36 is connected by means of a suitable quick-make joint 38 preferably of the bayonet type as shown to a cup-shaped or cylindrical enlargement 39 of the condensed steam pipe $n$ which projects through the cooking table 16. The steam supply pipe $g$ as shown projects upward through this cup-shaped enlargement 39 into the steam space 36 of the cooking pot. By this arrangement the condensed steam falls into the cup-shaped enlargement 39 and readily returns to the steam space in the heat accumulator in the manner aforesaid. The cup-shaped enlargement 39 is provided with an air-pipe 40 with a valve 41 which when opened allows any imprisoned air to escape when the steam is first turned on. To provide a tight joint, the edge of the neck 37 on the bottom of the cooking pot when in position is pressed on to an india rubber or like washer or pad 42 and there may be a packing or washer of wood 43 or the like between the idia rubber pad 42 and the cooking table 16.

It is of course evident that a heating unit such as is marked 44 in Fig. 11 may be provided in the lid of any of the cooking vessels, in order to provide "top heat".

The various heaters are of course controlled by suitable switches, the main heaters $v$, $x$, $y$, $z$, being, for instance, adapted to be switched on and off by switches 45, and the auxiliary heaters 4 and 9, and heater 44 by means of switches 46, 47 and 48 respectively.

What I claim as new and desire to secure by Letters Patent, is:

1. The combination of an electrical air heating device provided with a heat storage mass and an air heating passageway adapted to be heated by said mass, an electrical water heating and steam generating device provided with a heat storage mass and a water heating chamber or passage adapted to be heated by said mass, and a common electrical heating element for heating both heat storage masses.

2. The combination of an electrical air heating device provided with a heat storage mass and an air heating passageway adapted to be heated by said mass, an electrical water heating and steam generating device provided with a heat storage mass and a water heating chamber or passage adapted to be heated by said mass, the heat storage mass of the air heating device being arranged above but in proximity to the heat storage mass of the steam generating device, and a common electrical heating element arranged between the said heat storage masses.

3. In a cooking device, the combination of an oven, means for utilizing steam for cooking purposes, an air heater for heating air for the oven and suitably connected therewith, a water heating and steam generating device suitably connected with the means for utilizing the steam, and a common electrical heating element for heating both the air heater and the water heater and steam generator.

4. The combination of an electrical air heating device, an electrical water heating and steam generating device, and a common electrical heating element for heating both devices, adapted normally to heat the air heating device to a higher degree than it does the water heating and steam generating device.

5. The combination of an electrical air heating device, an electrical water heating and steam generating device, and a common electrical heating element for heating both devices, arranged between the two devices, and heat insulation between the said two devices, all so arranged that the different devices may be heated to different degrees of temperature.

6. The combination of an electrical air heating device provided with a heat storage mass and an air heating passageway adapted to be heated by said mass, an electrical water heating and steam generating device provided with a heat storage mass and a water heating chamber or passage adapted to be heated by said mass, and a common electrical heating element for heating both heat storage masses, adapted normally to heat the heat storage mass of the air heating device to a higher degree than it does the heat storage mass of the steam generating device.

7. The combination of an electrical air heating device provided with a heat storage mass and an air heating passageway adapted to be heated by said mass, an electrical water heating and steam generating device provided with a heat storage mass and a water heating chamber or passage adapted to be heated by said mass, the heat storage mass of the air heating device being arranged above but in proximity to the heat storage mass of the steam generating device, and a common electrical heating element arranged between the said heat storage masses in such a way as to heat the heat storage mass of the air heating device to a higher degree than it does the heat storage mass of the steam generating device.

8. In a cooking device, the combination of an oven, means for utilizing steam for cooking purposes, an air heater for heating air for the oven and suitably connected therewith, a water heating and steam generating device suitably connected with the means for utilizing the steam, and a common electrical heating element for heating both the air heater and the water heater and steam generator, so constructed and arranged as to heat the air heater to a higher degree of temperature than the water heater and steam generator.

9. The combination of an oven, an air heater provided with a heat storage mass arranged below the oven and provided with an air heating passageway adapted to be heated by said mass, an electrical water heating and steam generating device provided with a heat storage mass and a water heating chamber or passage adapted to be heated by said mass, the heat storage mass of the air heater being arranged above but in proximity to the heat storage mass of the steam generating device, a common electrical heating element arranged between the said heat storage masses in such a way as to heat the heat storage mass of the air heater to a higher degree than the heat storage mass of the steam generating device, means for supplying water to the steam generating device and for conveying steam to any desired point for cooking purposes, a vertical air flue leading from the passageway in the air heater to the oven, an electrical heating element arranged in said flue for heating the air therein and for starting and maintaining an upward flow of heated air to the oven, means for cutting one of the heating elements into operation and the other out of operation, and a return passage from the oven to the air heater for the return to it of the spent heated air.

10. Apparatus for cooking and for carrying out like operations by steam produced electrically, comprising in combination, a heat accumulator consisting of a mass of a material capable of storing heat and being a good conductor of heat, electrical means for heating said mass, a steam space in said mass, a feed water tank, means for supplying water as required from said feed water tank to said steam space, and steam outlets connected with said steam space, for supplying steam to cooking apparatus, said feed water tank being arranged below the level of said steam outlets, substantially as set forth.

11. Apparatus for cooking and for carrying out like operations by steam produced electrically, comprising in combination, a heat accumulator consisting of a mass of a material capable of storing heat, and being a good conductor of heat, electrical means for heating said mass, a steam space in said mass, means for supplying water as required to said steam space, means for supplying steam from said steam space to cooking apparatus, means for regulating said supply of steam, means for returning condensed steam from said cooking apparatus to said steam space and means for regulating said return of condensed steam, substantially as set forth.

12. A water heater and steam generator containing a heat storage mass, having an inclined passage therein for receiving and heating the water, the passage provided with a water inlet connecting with the lower end of the passage and a steam discharge outlet from the upper end of the passage.

13. A water heater and steam generator having an inclined passage therein for receiving and heating the water and changing it into steam, the passage provided with a water inlet connecting with the lower end of the passage and a steam discharge outlet from the upper end of the passage, and a water supply tank higher than the water inlet and connected with it and provided with a dip or trap below the inlet point.

In testimony whereof, I have signed my name to this specification, in the presence of two subscribing witnesses.

GEORGE GILBERT BELL.

Witnesses:
O. J. WORTH,
H. D. JAMESON.